(12) United States Patent
Holliday

(10) Patent No.: US 9,154,712 B2
(45) Date of Patent: Oct. 6, 2015

(54) THERMAL WINDOW WITH TRANSMITTER

(71) Applicant: Certification Information Limited, Middlesborough, Cleveland (GB)

(72) Inventor: Antony James Holliday, Haxby (GB)

(73) Assignee: Harrison Goddard Foote, Aberdeen (GB)

( * ) Notice: Subject to any disclaimer, the term of this patent is extended or adjusted under 35 U.S.C. 154(b) by 0 days.

(21) Appl. No.: 13/718,217

(22) Filed: Dec. 18, 2012

(65) Prior Publication Data
US 2013/0160373 A1 Jun. 27, 2013

(30) Foreign Application Priority Data

| Dec. 19, 2011 | (GB) | 1121818.7 |
| Mar. 9, 2012 | (GB) | 1204224.8 |
| Jun. 20, 2012 | (GB) | 1210908.8 |
| Nov. 22, 2012 | (GB) | 1220993.8 |

(51) Int. Cl.
*E05F 1/10* (2006.01)
*H04N 5/33* (2006.01)
*G01K 13/00* (2006.01)
*G02B 7/00* (2006.01)

(52) U.S. Cl.
CPC .. *H04N 5/33* (2013.01); *E05F 1/10* (2013.01); *G01K 13/00* (2013.01); *G02B 7/006* (2013.01); *G02B 7/008* (2013.01)

(58) Field of Classification Search
CPC .................................. E05F 1/10; H04N 5/33
USPC ............................. 49/501, 169, 171; 52/171.1
See application file for complete search history.

(56) References Cited

U.S. PATENT DOCUMENTS

| 4,869,021 | A | * | 9/1989 | Gregory | 49/171 |
| 6,121,880 | A | * | 9/2000 | Scott et al. | 340/572.5 |
| 6,275,157 | B1 | | 8/2001 | Mays et al. | |
| 7,989,769 | B2 | * | 8/2011 | Brandt et al. | 250/330 |
| 8,384,520 | B2 | * | 2/2013 | Fourreau | 340/10.1 |
| 8,400,708 | B2 | * | 3/2013 | Robinson | 359/350 |
| 8,407,938 | B2 | * | 4/2013 | Faria | 49/149 |
| 2001/0045463 | A1 | | 11/2001 | Madding et al. | |
| 2002/0014203 | A1 | | 2/2002 | Kim et al. | |
| 2004/0227987 | A1 | | 11/2004 | Holliday et al. | |
| 2006/0209397 | A1 | | 9/2006 | Holliday et al. | |
| 2006/0216011 | A1 | * | 9/2006 | Godehn | 396/58 |

(Continued)

FOREIGN PATENT DOCUMENTS

| EP | 2110650 A1 | 10/2009 |
| GB | 2447666 A | 9/2008 |

(Continued)

OTHER PUBLICATIONS

Machine translation of WO2011073541.*

*Primary Examiner* — Katherine Mitchell
*Assistant Examiner* — Scott Denion
(74) *Attorney, Agent, or Firm* — Anthony P. Filomena; Taft Stettinius & Hollister LLP

(57) ABSTRACT

A thermal window comprising a thermally transparent window member, a window frame for receiving the thermally transparent window member, and at least one transmitter configured to transmit electromagnetic radiation with a frequency from 3 Hz to 300 GHz. The thermal window also has a cover for protecting the thermally transparent window member, wherein the cover may be mounted to the window frame by a spring loaded hinge.

15 Claims, 3 Drawing Sheets

(56) References Cited

U.S. PATENT DOCUMENTS

| | | | |
|---|---|---|---|
| 2008/0191841 A1* | 8/2008 | Fourreau | 340/10.1 |
| 2010/0014152 A1* | 1/2010 | Robinson | 359/350 |
| 2010/0044567 A1* | 2/2010 | Brandt et al. | 250/334 |
| 2012/0307862 A1* | 12/2012 | Crottereau et al. | 374/130 |
| 2013/0118081 A1* | 5/2013 | Khoshkish | 49/74.1 |

FOREIGN PATENT DOCUMENTS

| | | |
|---|---|---|
| WO | 01/65046 A1 | 9/2001 |
| WO | WO 2011073541 A1 * | 6/2011 |
| WO | 2012/037575 A1 | 3/2012 |
| WO | WO2012037575 A1 * | 3/2012 |

* cited by examiner

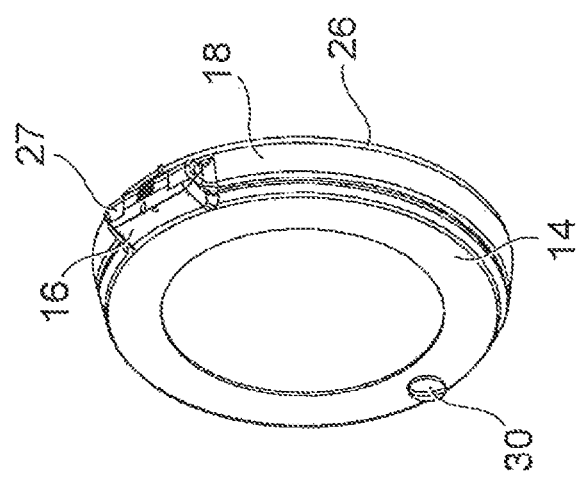
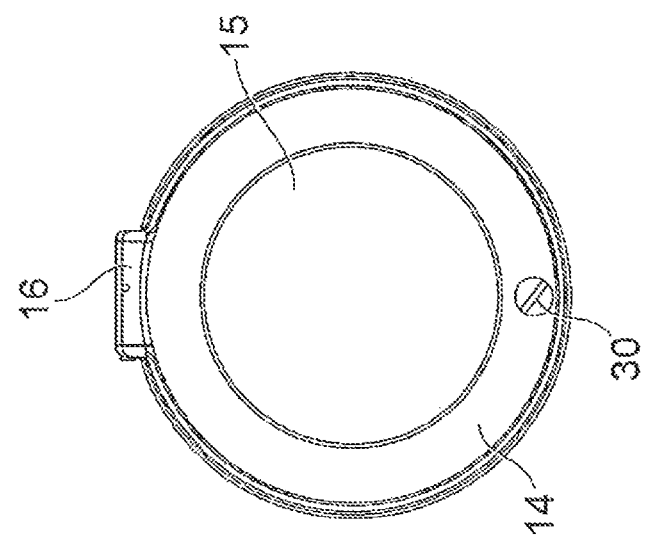
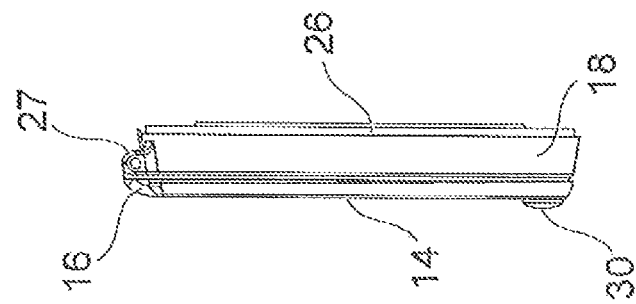

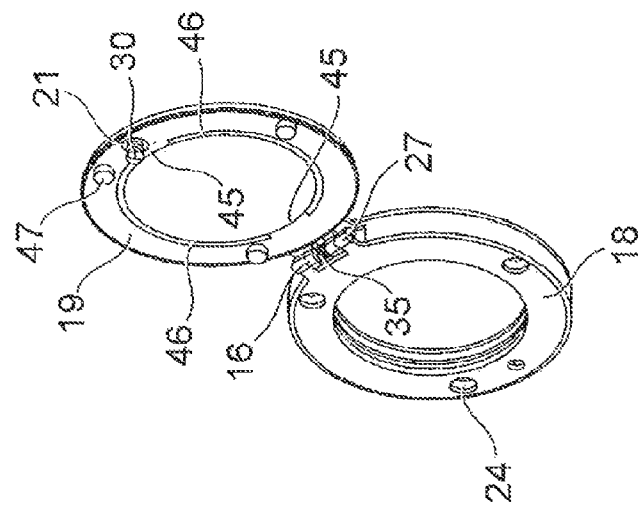
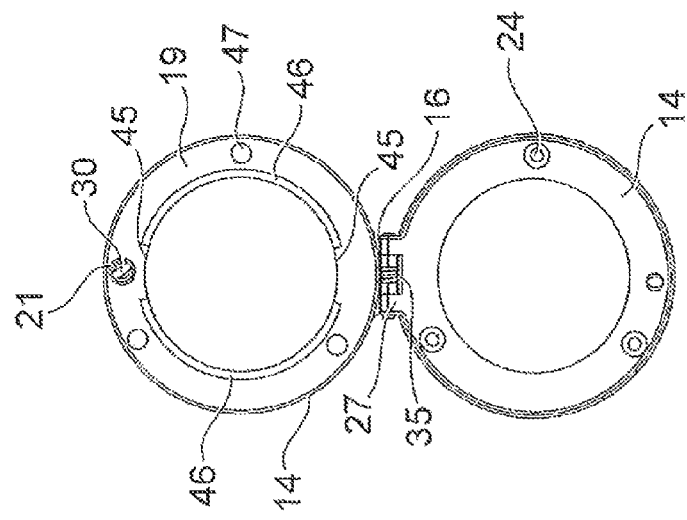
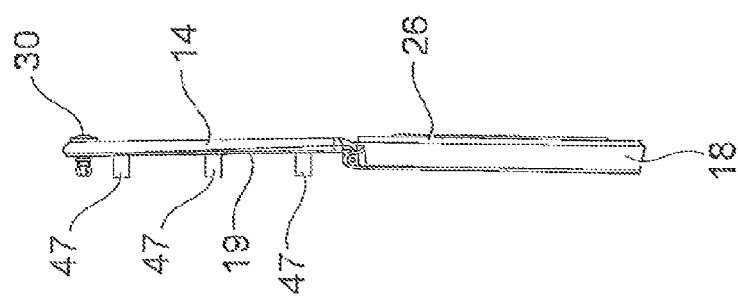
Fig. 3d
Fig. 3b
Fig. 3c
Fig. 3a

THERMAL WINDOW WITH TRANSMITTER

CROSS REFERENCE TO RELATED APPLICATIONS

The present application claims the benefit of Great Britain Patent Application No. 1121818.7, filed Dec. 19, 2011, and Great Britain Patent Application No. 1204224.8, filed Mar. 9, 2012, and Great Britain Patent Application No. 1210908.8, filed Jun. 20, 2012, and Great Britain Patent Application No. 1220993.8, filed Nov. 22, 2012, the disclosure of each of which is hereby incorporated by reference.

RELATED ART

1. Field of the Invention

The present invention relates to a thermal window for an electronic control box containing at least one electronic component. The at least one electronic component is typically partially or completely enclosed in the electronic control box, the thermal window providing for diagnostic inspection of the at least one electronic component therein. The thermal window can be fitted to the electronic control box when it is manufactured or retrofitted to an existing electronic control box. The present invention also relates to a method of monitoring the thermal behaviour of the at least one electronic component.

2. Brief Discussion of Related Art

In-situ monitoring of the performance and behaviour of engineering equipment, and in particular of control electronics and electronic components, is generally desirable to maintain optimal performance of the electronic components, to diagnose potential problems at an early stage, and thus to reduce or avoid major system problems and breakdowns. It is particularly desirable if diagnostic procedures can be carried out in-situ whilst the electronic components are functioning, to avoid expensive periods of down time.

Manufacturers, hotels and leisure facility providers in particular reply upon lighting, heating and/or system automation that all use electricity. The equipment used should be monitored to ensure it is safe because electricity is potentially harmful. Death by electrocution caused by direct contact with a live conductor or via an arc-flash explosion due to the catastrophic failure of the equipment is a daily risk to all users of the equipment.

Monitoring the thermal behaviour of electronic components and systems is known as an effective diagnostic tool for the evaluation of performance and the early identification of potential problems. Producing and analysing thermal images of such systems by means of suitable thermal imaging equipment can be a valuable aid in this regard. However, problems arise where the electronic components or systems are wholly or partially enclosed within the overall apparatus, for example behind a control panel and/or within a control box, and as a result are not readily accessible and/or visible for such analysis.

To carry out an evaluation of such electronic components it is commonly necessary first to shut down the apparatus, then to open the box or other enclosure of the control electronics, trip any safety device which is likely to be in place to prevent operation of the apparatus in such a state, and subsequently to restart the apparatus to perform the analysis. This is likely to lead to long periods of down time, may have safety implications since the apparatus is being operated in a fundamentally unsafe state, and in relation to certain apparatus and processes may not be possible.

In such circumstances, the fitment of thermally transparent windows within the walls of the control panel, box or other enclosure has been proposed to enable the thermal monitoring of electronic components and systems there within. Such windows may be provided at the time of manufacture of the apparatus or can be retrofitted.

INTRODUCTION TO THE INVENTION

In accordance with a first aspect of the present invention there is provided a thermal window comprising: (a) a thermally transparent window member, (b) a window frame for receiving the thermally transparent window member, (c) at least one transmitter configured to transmit electromagnetic radiation with a frequency from 3 Hz to 300 GHz, and (d) a cover for protecting the thermally transparent window member, wherein optionally the cover is mounted to the window frame by a spring loaded hinge.

The at least one transmitter may be configured to transmit electromagnetic radiation with a frequency from 433 to 435 MHz, normally from 433.050 to 434.790 MHz, typically 433 MHz. The electromagnetic radiation with a frequency from 433.050 to 434.790 MHz, from 433 to 435 MHz, or 433 MHz may be a Wi-Fi™ signal. The at least one transmitter may be configured to transmit the Wi-Fi™ signal. The at least one transmitter may be referred to as a Wi-Fi™ transmitter.

The at least one transmitter may be configured to transmit electromagnetic radiation with a frequency from 300 MHz to 300 GHz. The electromagnetic radiation with a frequency from 300 MHz to 300 GHz may be microwave radiation. The electromagnetic radiation with a frequency from 300 MHz to 300 GHz may be a Wi-Fi™ signal.

The at least one transmitter may be configured to transmit electromagnetic radiation with a frequency from 2.4 GHz to 2.5 GHz, normally from 2.400 GHz to 2.500 GHz. The electromagnetic radiation with a frequency from 2.400 GHz to 2.500 GHz or from 2.4 GHz to 2.5 GHz may be a Wi-Fi™ signal.

The Wi-Fi™ signal may be an Industrial, Scientific and Medical (ISM) radio band signal. The power of the Wi-Fi™ signal may be low and/or may be less than or equal to 0 dBm. The range of the Wi-Fi™ signal may be short and/or may be less than or equal to 20 m, normally less than or equal to 2 m, typically less than or equal to 1 m.

The at least one transmitter may transmit information and thereby enable a suitably enabled thermal imager or thermal imaging camera to receive information about the thermal window. The information from the at least one transmitter may be up-to-date, that is current and/or not historical.

The information from the at least one transmitter may include the temperature of the thermal window. The information from the at least one transmitter may include the temperature of the thermally transparent window member. The temperature may be the optic temperature.

The temperature may be measured by a thermometer that is in contact with the thermal window or thermally transparent window member and connected to or in communication with the at least on transmitter. The thermometer may be able to detect temperatures of −10C to +60° C. The thermometer may have an accuracy of ±5%.

The temperature may be measured by a thermocouple and/or resistance temperature detector (RTD) that is in contact with the thermal window or thermally transparent window member and connected to or in communication with the at least one transmitter. The thermocouple and/or resistance temperature detector (RTD) may be able to detect temperatures from −10C to +60° C. The thermocouple and/or resistance temperature detector (RTD) may have an accuracy of ±5%.

The information from the at least one transmitter may include usage statistics for the thermal window. The usage statistics may be one or more of a unique identification number or code for a particular thermal window; the current date and/or time; the date and/or time of an earlier inspection of electronic components using the thermal window; and the charge status of a battery used to power the at least one transmitter.

The thermal window may comprise at least one transponder. The at least one transponder may be configured to transmit electromagnetic radiation with a frequency from 3 Hz to 300 GHz, typically from 13 to 14 MHz in response to an interrogating received electromagnetic signal. The electromagnetic signal may be a magnetic field and/or electromagnetic induction.

The at least one transponder may transmit electromagnetic radiation with a frequency from 13.553 to 13.567 MHz and typically 13.5 MHz. The at least one transponder may be a radio-frequency identification (RFID) device, also referred to as an RFID tag. The RFID device may be a high frequency RFID tag.

The RFID tag may comprise a radio-frequency electromagnetic field coil configured to modulate an external electromagnetic field and thereby transfer a coded identification number when queried by a reader device. The reader device may transmit the external electromagnetic field or interrogating received electromagnetic signal and may be an RFID enabled device, for example thermal imaging equipment such as a thermal imaging camera.

The at least one transponder may be configured to transmit a radio-frequency identification signal with a high frequency, that is frequency from 10 to 15 MHz, typically 13.5 MHz. Using high frequency reduces the likelihood of interference with an identification signal transmitted by nearby or adjacent electronic equipment.

The at least one transmitter and/or at least one transponder may be in the window frame and/or cover and may be encased in the window frame and/or cover. In an alternative embodiment the at least one transmitter and/or at least one transponder may be positioned adjacent to the window frame.

The RFID device may be capable of transmitting information about the particular window being monitored. The information may for example be about the location of the thermal window and the transmission characteristics of the corresponding thermally transparent window member. Such information can be linked to the infrared image taken so that the operator can more easily catalogue and store images for historical analysis and trending. The transmission characteristics may enable the user to correct for any attenuation caused by the thermally transparent window member either manually or automatically within a thermal imaging camera, thus providing fast and accurate measurement of internal components The RFID device may enable an RFID enabled thermal imager or thermal imaging camera to communicate with the thermal window and as such correct the reading taken by the thermal imager or thermal imaging camera for any error due to the crystal optics of the thermally transparent window member.

The RFID device may be programmable either at the factory or in the field and may include information about the type of thermal window, its transmission characteristics, location and other information about its manufacture.

In an alternative embodiment the thermal window may include a barcode or serial number. In a further alternative embodiment the barcode or serial number may be positioned adjacent to the window frame. The barcode or serial number may perform a similar function to the RFID device.

The RFID device, barcode and/or serial number may provide the thermal imaging equipment, for example a thermal imaging camera, with information about the location of the thermal window and/or the transmission characteristics of the corresponding thermally transparent window member.

In use, the thermal window serves to provide a physical barrier between electronic equipment inside a control box and the operator of for example thermal imaging equipment used to collect information about the thermal behaviour of the electronic equipment. It will be understood that there are a number of reasons why this might be desirable, including physical protection of the equipment and the safety of the operator. The electronic equipment may be referred to as switchgear.

Information from the at least one transmitter and/or at least one transponder may include data about the electronic equipment. The data may relate to the operation of the electronic equipment. The data may relate to the current and/or voltage ratings of the electronic equipment.

The at least one transmitter may be powered by a battery. The battery is typically replaceable. The battery is normally a button cell battery.

The Wi-Fi™ transmitter and RFID tag typically use electromagnetic radiation as a means to communicate information but may operate and/or function differently. The Wi-Fi™ transmitter may be powered by, for example, a battery. The battery may provide the Wi-Fi™ transmitter with power to transmit a signal, in the form of electromagnetic radiation, and thereby provide two-way communication between the Wi-Fi™ transmitter and another Wi-Fi™ enabled device, for example thermal imaging equipment such as a thermal imaging camera. The two-way communication typically means that the Wi-Fi™ transmitter both listens for and responds to a signal from the thermal imaging equipment. The Wi-Fi™ transmitter typically sends an electromagnetic signal for detection by another Wi-Fi™ enabled device, able to receive that signal, for example thermal imaging equipment such as a thermal imaging camera.

In contrast, an RFID tag is typically not powered. An RFID tag typically provides one-way communication with another RFID enabled device, for example thermal imaging equipment such as a thermal imaging camera. An electromagnetic signal sent by an RFID enabled device is typically only reflected by the RFID tag.

The Wi-Fi™ transmitter may have an electronic memory for the storage and transmission of information. The RFID tag may not have any electronic memory.

The window frame may have a first surface with a recess to receive the thermally transparent window member. The thermally transparent window member may be engageable within the recess such that at least an edge portion of a first face of the thermally transparent window member contacts the first surface of the window frame.

The thermal window may include a securing seal engageable with the first surface of the window frame and so configured to hold the thermally transparent window member in the recess.

The cover may be engageable with a second surface of the window frame.

In accordance with a second aspect of the present invention there is provided a thermal window comprising: (a) a window frame having a first surface with a recess to receive a thermally transparent window member, the thermally transparent window member being engageable within the recess such that at least an edge portion of a first face of the thermally transparent window member contacts the first surface of the window frame, (b) a securing seal engageable with the first surface of the window frame and so configured to hold the thermally transparent window member in the recess, (c) at least one transmitter configured to transmit electromagnetic radiation with a frequency from 3 Hz to 300 GHz, and (d) a cover to protect the thermally transparent window member, the cover being engageable with a second surface of the window frame and wherein optionally, the cover is mounted to the window frame by a spring loaded hinge.

The at least one transmitter may be configured to transmit electromagnetic radiation with a frequency from 433 to 435 MHz, normally from 433.050 to 434.790 MHz, typically 433 MHz. The electromagnetic radiation with a frequency from 433.050 to 434.790 MHz, from 433 to 435 MHz, or 433 MHz may be a Wi-Fi™ signal. The at least one transmitter may be configured to transmit the Wi-Fi™ signal. The at least one transmitter may be referred to as a Wi-Fi™ transmitter.

The at least one transmitter may be configured to transmit electromagnetic radiation with a frequency from 300 MHz to 300 GHz. The electromagnetic radiation with a frequency from 300 MHz to 300 GHz may be microwave radiation. The electromagnetic radiation with a frequency from 300 MHz to 300 GHz may be a Wi-Fi™ signal.

The at least one transmitter may be configured to transmit electromagnetic radiation with a frequency from 2.4 GHz to 2.5 GHz, normally from 2.400 GHz to 2.500 GHz. The electromagnetic radiation with a frequency from 2.400 GHz to 2.500 GHz or from 2.4 GHz to 2.5 GHz may be a Wi-Fi™ signal.

The thermal window may comprise at least one transponder. The at least one transponder may be configured to transmit electromagnetic radiation with a frequency from 3 Hz to 300 GHz, typically from 13 to 14 MHz, optionally from 13.553 to 13.567 MHz and typically 13.5 MHz. The at least one transponder may be a radio-frequency identification (RFID) device, also referred to as an RFID tag. The RFID device may be a high frequency RFID tag.

The cover may protect the first face of the thermally transparent window member.

The cover may be moveable from a first position in which it protects the thermally transparent window member to a second position in which the thermally transparent window member is exposed and accessible to for example thermal imaging equipment such as a thermal imaging camera.

The cover may be partially or completely transparent or opaque. The cover may be partially or completely made of poly (methyl methacrylate) or PMMA, also referred to as acrylic glass, Plexiglas™, Lucite or Perspex™. Alternatively the cover may be partially or completely made of polycarbonate or PC, also referred to as Lexan™.

The cover is typically attached to the window frame and therefore captive. This has the advantage that it increases the speed at which an operator can open or remove the cover from over the thermally transparent window member, take a reading and replace the cover.

When the cover is mounted or attached to the window frame by the spring loaded hinge, then in use the cover is not disconnected from the window frame and this mitigates the risk of the cover being misplaced.

The spring loaded hinge may be biased to hold the cover in the second, open position in which the thermally transparent window member is exposed. The spring loaded hinge means the thermal window can be attached to a control box in any orientation. Even if the hinge is at an uppermost edge of the window frame, the cover will still be biased towards the second, open position in which the thermally transparent window member is exposed. This is important because it allows the thermal window to be positioned on the control box so the thermal window is most accessible and the cover of the thermal window is least likely to obstruct other control means, including emergency control buttons.

The thermally transparent window member may be made of a material that is transparent to infrared radiation and a material therefore that infrared radiation is able to pass through. The material may be a glass or plastic or a crystalline material. The thermally transparent window member maybe made from calcium fluoride, sapphire glass, PoIyIR™ polymer or any other suitable material or combination of materials that allows infrared transmission in the wavelength range of from 0.5 µm to 14 µm.

The thermal imaging equipment may communicate with a data server. The data server may be remotely located. Information held on the data server may also be available to the thermal imaging equipment. Data communication between the thermal imaging equipment and the data server may be two-way. The data server may provide the thermal imaging equipment with information about the infrared transmission of the thermally transparent window. This may allow for real-time adjustment of any image obtained by the thermal imaging equipment to correct for the particular infrared transmission of the particular thermally transparent window.

Information about the infrared transmission of the thermally transparent window may be uploaded to the data server when the thermal window is manufactured or may be uploaded later.

The thermal imaging equipment may communicate directly with the data server or via for example, a computer or PDA (Personal Digital Assistant) onto which data from the thermal imaging equipment has been downloaded. The thermal imaging equipment, computer or PDA and data server may be used in combination to create a schedule of the monitoring required and/or maintenance of the electronic components.

Data collected by the thermal imaging apparatus may be saved in a database on the data server and indexed to a particular thermal window so that an operator of the electronic equipment can monitor or track potential problems or low-level faults.

The at least one transmitter may be configured to transmit information that is unique to the particular thermal window.

The cover may be secured to the window frame by a locking mechanism including a fastener or locking screw. The fastener may be captive and therefore remain attached to the window frame or cover when the cover is in both the first and second positions.

The fastener may comprise a lock and socket. The lock may be attached to the cover and the socket attached to or part of the window frame. The lock and socket may be a quarter-turn locking mechanism that requires the lock to be rotated by about 90 degrees or a quarter-turn to move the lock in the socket from a locked position to an unlocked position. In the locked position the lock engages with the socket to hold the cover in the first, closed position against the window frame. In the unlocked position the lock is movable in the socket such that the cover can be moved or can move by action of the spring loaded hinge from the first closed position to the second open position.

The quarter-turn lock means that an operator can quickly remove or move the cover to expose the thermally transparent window member, take the necessary reading and replace the cover. In use the lock may remain attached to the cover and this mitigates the risk of the lock being misplaced.

The locking mechanism may be a push-to-release catch. The operator may push the cover towards the window frame to release the cover from the frame and thereby move the cover to the second open position. The operator may push the cover towards the window frame to latch the cover to the window frame and thereby move the cover to the first closed position.

There may be a first seal, optionally an o-ring seal between the window frame and the control box. The o-ring may provide a seal that engages a surface around a suitable aperture in the control box so as to seal the window frame (and so also the thermally transparent window member) in position over the aperture in the casing of the electronic control system. There may be a second seal between the thermally transparent window member and the window frame.

The first and/or second seal may provide a moisture-tight seal between inside and outside of the control box. The first and/or second seal may be made of a silicone-based material. For many applications it will be desirable for the thermal window to co-operate with casing of the control box to create a closed, controlled environment for the equipment in the control box (for example to prevent ingress of dust, moisture, or the like).

The thermal window may be attached to the control box by securing means. The securing means may comprise mechanical fixings. The securing means may be one or more screw(s) or nut(s) and bolt(s) and may fit into one or more apertures in the window frame. The securing means may comprise one or more spring clip(s) attached to the thermal window and typically attached to the window frame. Each spring clip may have a leg that, when the thermal window is being installed, is pushed through a suitable aperture in the control box and engages an inner surface of the control box to hold the thermal window against an outer surface of the control box. The spring clip may be prevented from being pulled back through the aperture in the control box by a locking pin that passes through a portion of the spring clip to lock the leg in position against the inner surface of the control box.

There may be a gasket between the cover and the window frame. The gasket may be between the cover and the second surface of the window frame.

The gasket may be attached to the cover. When the gasket is attached to the cover and the cover is in the second position, the thermally transparent window member is exposed and the securing means of the window frame are also exposed, allowing relatively easy removal and/or subsequent replacement of the thermal window.

The gasket attached to the cover may comprise a face-seal. The gasket may include at least one protrusion, that when the cover is in the second closed position, penetrates into the one or more apertures in the window frame. When the cover is in the second closed position, the gasket and protrusions from the gasket may reduce the chance of fluid such as water penetrating the cover and coming into contact with the thermally transparent window member providing an additional seal against water penetration into the control box.

Attaching the gasket to the cover and not the window frame reduces the time required to install the thermal window on the control box because there is no need for the installer to fit the gasket, rather the gasket has been fitted to the cover during manufacture of the thermal window.

Monitoring the thermal behaviour of electronic components and systems provides for the detection of low-level faults that are power hungry or cause an increase in the power consumption of the particular electronic component. These low-level faults generate heat. This heat contributes to the electrical inefficiency of the electrical component but the heat generated may not be sufficient to raise an alarm such as fire alarm. If the low-level faults can be quickly and/or routinely identified then the energy efficiency of the electronic component can be maximised, thereby reducing the carbon footprint of the electronic component and improving its eco-credentials.

It will be understood that one purpose of the thermally transparent window member is to afford a degree of protection to the electronic equipment in the control box whilst enabling observation thereof by suitable thermal imaging means. Accordingly the thermally transparent window member must afford a degree of effective thermal transparency. In many circumstances, particularly where an environmentally sealed unit is desirable, this will most readily be achievable by use of a thermal window comprising an integral thermally transparent window member fabricated of material exhibiting reasonable infra-red transparency. Nevertheless, the invention is not so restricted, and it might be envisaged, particularly in circumstances where a high degree of environmental protection was not required, that the window member could constitute a mesh-like element, achieving the required degree of effective transparency by virtue of the apertures within the mesh.

The window member may be fabricated from a material exhibiting inherently high thermal transparency at the infra-red frequencies to be investigated. Suitable materials will be known to those skilled in the art, and will include specialist glasses and single crystal materials.

The optional features of the first aspect of the present invention can be incorporated into the second aspect of the present invention and vice versa.

In accordance with a third aspect of the present invention there is provided a method of monitoring the thermal behaviour of at least one electronic component, the at least one electronic component being at least partially enclosed, the method comprising the steps of: (a) providing a thermal window as described herein; (b) turning the fastener to release the cover, allowing the cover to move from the first closed position to the second open position; (c) monitoring the thermal behaviour of the at least one electronic component through the thermally transparent window member; (d) moving the cover from the second open position to the first closed position; and (e) turning the fastener to secure the cover to the window frame.

Turning the fastener may involve turning it by between 70 and 110 degrees. Preferably the fastener is turned by between 80 and 100 degrees, normally 90 degrees. The fastener may be rotated by a quarter-turn.

Monitoring the thermal behaviour of the at least one electronic component may be achieved using the thermal imaging equipment.

The thermal window may include at least one transmitter configured to transmit electromagnetic radiation with a frequency from 3 Hz to 300 GHz, typically from 433 to 435 MHz. The at least one transmitter may be configured to transmit a Wi-Fi™ signal. The at least one transmitter may be referred to as a Wi-Fi™ transmitter. The method may further include the step of scanning the at least one transmitter to read the information transmitted by the at least one transmitter.

The thermal window may comprise at least one transponder. The at least one transponder may be configured to transmit electromagnetic radiation with a frequency from 3 Hz to 300 GHz, typically from 13 to 14 MHz. The at least one transponder may be a radio-frequency identification (RFID) device, also referred to as an RFID tag. The RFID device may be a high frequency RFID tag. The method may further include the step of scanning the at least one transponder to collect the information stored by the at least one transponder.

The thermal window may include the Wi-Fi™ transmitter and RFID device. In an alternative embodiment the Wi-Fi™ transmitter and/or RFID device may be positioned adjacent to the window frame. The Wi-Fi™ transmitter and/or RFID device may be in the window frame and/or cover and may be encased in the window frame and/or cover. The Wi-Fi™ transmitter and/or RFID device may be capable of transmitting information about the particular thermal window being monitored. The information may include data pertaining to the location and/or physical characteristics of the thermal window. The information may be transmitted to thermal imaging equipment such as a thermal imaging camera.

The at least one electronic component may be at least partially or totally enclosed in a control box.

The method may further include the step of communicating data between a data server and the thermal imaging equipment. The data transmitted may provide the user of the thermal imaging equipment with a route for monitoring and/or the maintenance required on the at least one electronic component. The user of the thermal imaging equipment may be provided with a schedule of the monitoring and/or maintenance required.

The optional features of the first and second aspects of the present invention can be incorporated into the third aspect of the present invention and vice versa.

In accordance with a fourth aspect of the present invention there is provided a method of monitoring the thermal behaviour of at least one electronic component through a thermal window, the method comprising the steps of: (a) providing the thermal window comprising at least one transmitter configured to transmit electromagnetic radiation with a frequency from 3 Hz to 300 GHz and a thermally transparent window member with a cover for protecting the thermally transparent window member, wherein optionally, the cover is mounted to the thermal window by a spring loaded hinge, the spring loaded hinge acting against the cover; (b) operating a locking mechanism to release the cover, allowing the cover to move from a first closed position in which it protects the thermally transparent window member to a second open position; (c) monitoring the thermal behaviour of the at least one electronic component; and (d) scanning the at least one transmitter.

The at least one transmitter may be configured to transmit electromagnetic radiation with a frequency from 433 to 435 MHz.

The optional features of the first, second and/or third aspects of the present invention can be incorporated into the fourth aspect of the present invention and vice versa.

BRIEF DESCRIPTION OF THE DRAWINGS

An embodiment of the invention will now be described by way of example only and with reference to the accompanying drawings.

FIG. 2a is a side view of the assembled thermal window of FIG. 1 when the cover is in a first, closed position;

FIG. 2b is a plan view of the cover of the thermal window of FIG. 1 in the first, closed position;

FIG. 2c is a perspective view of the thermal window of FIG. 1 in the first, closed position;

FIG. 3a is side view of the thermal window of FIG. 1 when the cover is in a second, open position;

FIG. 3b is a plan view of the thermal window of FIG. 1 when the cover is in the second, open position;

FIG. 3c is a top view of the thermal window of FIG. 1 when the cover is in the second, open position; and FIG. 3d is a perspective view of the thermal window of FIG. 1 when the cover is in the second, open position.

DETAILED DESCRIPTION

Figure 1:
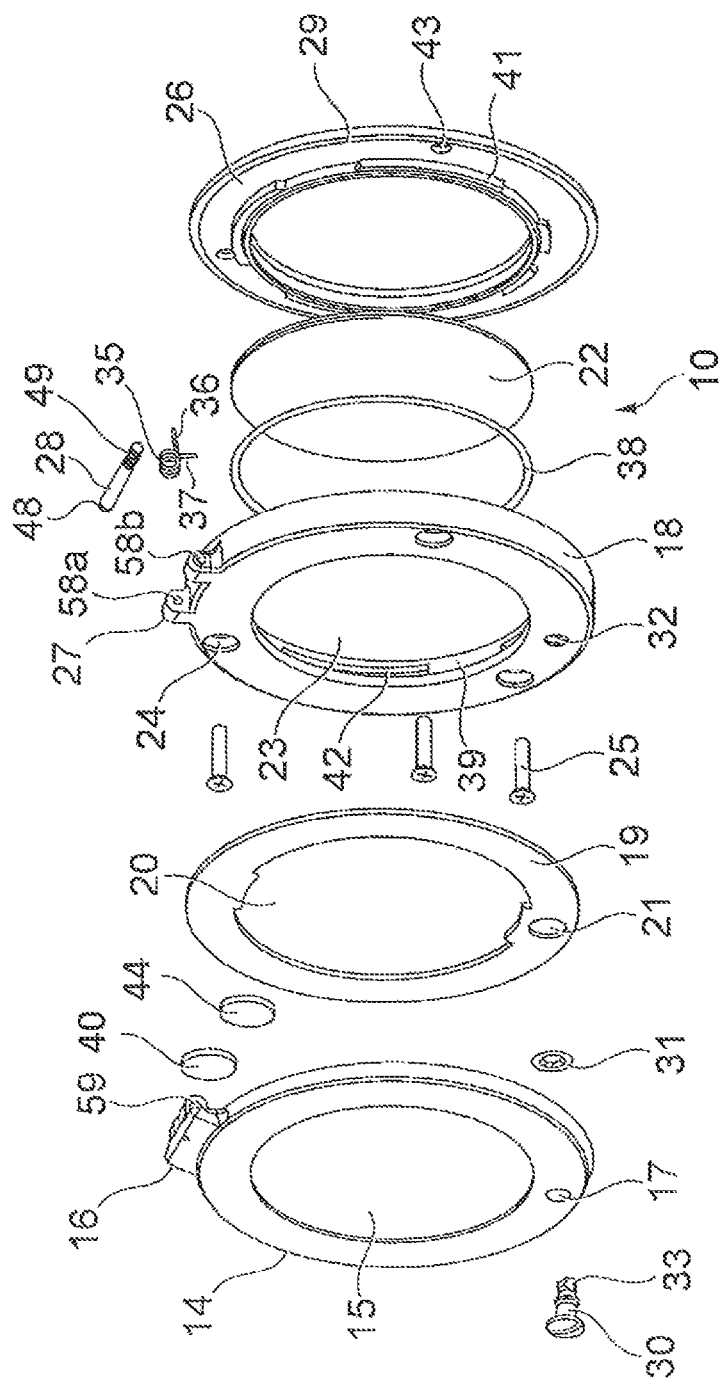
FIG. 1 is an exploded view of the thermal window in accordance with an aspect of the present invention.

The exemplary embodiments of the present disclosure are described and illustrated below to encompass thermal window for an electronic control box containing at least one electronic component. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

FIG. 1 shows the thermal window 10, including a cover 14, window frame 18, thermally transparent window member 22 and securing seal 26. FIG. 1 is an exploded, disassembled view of the thermal window 10. The cover 14 has a transparent centre portion 15, first hinge portion 16 and aperture 17 for receiving a fastener 30.

FIG. 1 shows the forward facing surfaces of the various components of the thermal window 10. The skilled reader will appreciate each of the components also has a corresponding rearward facing surface that is not shown in FIG. 1.

In this embodiment an RFID tag 40 is located in the cover 14. The RFID tag 40 fits into a hollow (not shown) in the rearward facing surface of the cover 14. A gasket 19 is attached to and extends over the rearward facing surface of the cover 14 and RFID tag 40. When assembled the outermost rearward facing surface of the RFID tag 40 is flush with the rearward facing surface of the cover 14 to which the gasket 19 is attached.

In this embodiment a Wi-Fi™ transmitter 44 is located in the cover 14. The Wi-Fi™ transmitter 44 fits into a hollow (not shown) in the rearward facing surface of the cover 14. A gasket 19 is attached to and extends over the rearward facing surface of the cover 14 and Wi-Fi™ transmitter 44. When assembled the outermost rearward facing surface of the Wi-Fi™ transmitter 44 is flush with the rearward facing surface of the cover 14 to which the gasket 19 is attached.

The gasket 19 has an aperture 20 corresponding to the transparent centre portion 15 of the cover 14 and another aperture 21 in which the fastener 30 and a retainer 31 are located.

The window frame 18 has an aperture 23 corresponding to the aperture 20 of the gasket 19 and transparent centre portion 15 of the cover 14. The window frame 18 also has screw holes 24 into which screws 25 can be located to hold the window frame and other parts of the thermal window to the control panel (not shown). The window frame 18 also has a socket 32 that cooperates with the fastener 30.

In use the cover 14 is moved into a first position in which it covers and protects the thermally transparent window member 22. The operator holds the cover 14 against the window frame 18 and turns the fastener 30 through 90 degrees or a quarter-turn so that the lugs 33 on the fastener 30 engage with and are retained in the socket 32.

The window frame 18 has a second hinge portion 27 that cooperates with the first hinge portion 16 of the cover 14. A pin 28 passes through holes 59 in the first hinge portion 16 and holes 58a, 58b in the second hinge portion 27 to secure the two portions together. The pin 28 passes through a spring 35, the ends 36, 37 of the spring 35 acting against the window frame 18 and the cover 14, when the window frame 18 and cover 14 are connected together. The spring 35 is biased to move the cover 14 into the second, open position in which the thermally transparent window member is exposed, as shown in FIGS. 3a to 3d. The pin 28 has a flange 48 at one end and a threaded portion 49 at the other end. The threaded portion 49 cooperates with a threaded surface (not shown) inside hole 58b of the second hinge portion 27.

An o-ring 38 is located between the window frame 18 and thermally transparent window member 22 to provide a seal between the two components and prevent direct contact of the thermally transparent window member 22 and a recessed surface 39 of the window frame 18. The o-ring 38 also reduces the likelihood of damage to the thermally transparent window member 22 due to its contact with the recessed surface 39. The thermally transparent window member 22 is secured in the recess 39 of the window frame 18 by the securing seal 26.

The securing seal 26 has a raised lip 29. The raised lip 29 is part of the securing seal 26 and is compressed against the rearward face of the thermally transparent window member 22 when the thermal window 10 is attached to the control panel (not shown).

The raised lip 29 is outside the pitch circle diameter of the holes 43 to prevent moisture entering the control panel (not shown) via the holes 43. The raised lip 29 may create a better seal between the securing seal 26 and thermally transparent window member 22 compared to a conventional o-ring.

The securing seal 26 has locating bars 41 that cooperate with slots 42 in the recessed surface 39 of the window frame 18, to orientate the securing seal 26 and window frame 18 so that the screw holes 24 in the window frame 18 line up With the holes 43 in the securing seal 26.

The thermal window 10 is attached to the control panel (not shown) using screws 25. The screws 25 are pushed through the screw holes 24 in the window frame 18 and holes 43 in the securing seal 26. The screws 25 are self-tapping screws and are turned so that they grip the outer edge of a corresponding pilot hole (not shown) that has been pre-drilled in the control panel (not shown).

The thermally transparent window member 22 is typically made of glass, transparent to infrared radiation. The thermally transparent window member 22 may comprise a single crystal or other suitable material exhibiting high transparency to infrared wavelengths. The window frame 18 and/or securing seal 26 and/or cover 14 is made of aluminium. The securing seal 26 is made of silicone, the silicone may be the type KSIL60. In an alternative embodiment the securing seal 26 is made of a nitrile-based material and in a further alternative embodiment it is made of a fluorocarbon-based material. The gasket 19 is a silicone gasket. The cover 14 is made of Plexiglas™. In alternative embodiments the cover may be made of any suitable transparent material including a suitable metallic material. The cover may be made of Lexan™.

The thermal window 10 is fitted in position over an aperture in a control panel (not shown) containing electronic equipment in accordance with the invention. The thermal window 10 allows examination of the electronic equipment (not shown) from a suitable external position using thermal imaging means (not shown).

FIGS. 2a, 2b and 2c show a side, plan and perspective view respectively of the assembled thermal window 10 of FIG. 1 when the cover 14 is in a first, closed position. FIGS. 2a and c show the cover 14 with first hinge portion 16 and fastener 30. It also shows the window frame 18 with second hinge portion 27 and the securing seal 26. FIG. 2b shows the cover 14 with transparent centre portion 15, first hinge portion 16 and fastener 30.

FIGS. 3a, 3b, 3c and 3d show a side, plan, top and perspective view respectively of the thermal window of FIG. 1 when the cover 14 is in the second, open position.

FIG. 3a shows the cover 14 and window frame 18 parallel or at 180 degrees to one another. FIG. 3a also shows the fastener 30 and protrusions 47 from the gasket 19 and securing seal 26.

FIGS. 3b and d show the cover 14, fastener 30 and gasket 19. They also show the aperture 21 in the gasket 19 through which the fastener 30 passes. The gasket 19 has castellations 45 located between raised locating edges 46 of the cover 14. The castellations 45 ensure that the gasket 19 is located correctly on the cover 14 such that the protrusions 47 from the gasket 19 are located in the screw holes 24 when the cover 14 is in the first, closed position. FIGS. 3b and d also show the cover 14 with first hinge portion 16 and window frame 18 with second hinge portion 27. The spring 35 is shown between the hinge portions 16, 27.

FIG. 3c shows the cover 14 and fastener 30.

There is also herein described a method of monitoring the thermal behaviour of an electronic component (not shown) enclosed in a control panel (not shown). The method uses a thermal window 10 as described herein.

First the operator turns the fastener 30 to release the cover 14, allowing the cover 14 to move from the first closed position (as shown in FIGS. 2a to c) to the second open position (as shown in FIGS. 3a to d). The operator can then monitor the thermal behaviour of the electronic component through the thermally transparent window member 22. Because the cover 14 is held in the second open position (as shown in FIGS. 3a to d) by the spring 35 acting between the hinge portions 16, 27, the operator does not need to hold the cover 14 away from the thermally transparent window member 22.

The relative orientation of the thermal window 10 on the control box (not shown) does not affect the ability of the spring 35 loaded hinge 16, 27 to hold the cover 14 in the second open position (as shown in FIGS. 3a to d).

When the operator has collected the data, the operator moves the cover 14 from the second open position (as shown in FIGS. 3a to d) to the first closed position (as shown in FIGS. 2a to c). The operator turns the fastener 30 to secure the cover 14 to the window frame 18. In this embodiment the operator turns the fastener 30 by 90 degrees or a quarter-turn to secure the cover 14 to the window frame 18 and seal the thermally transparent window member 22 from external sources of dirt, dust and moisture.

The quarter-turn of the fastener 30 moves the lugs 33 on the fastener 30 relative to engaging surfaces (not shown) in the socket 32 between an engaged and disengaged position. In the engaged position the cover 14 is held against the window frame 18; in the disengaged position the cover 14 moves from the first closed position (as shown in FIGS. 2a to c) to the second open position (as shown in FIGS. 3a to d) under the bias of the spring 35.

Following from the above description and invention summaries, it should be apparent to those of ordinary skill in the art that, while the methods and apparatuses herein described constitute exemplary embodiments of the present invention, the invention is not limited to the foregoing and changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A thermal window comprising:
a thermally transparent window member having a forward facing surface and a rearward facing surface,
a window frame for receiving the thermally transparent window member,
at least one transmitter configured to transmit electromagnetic radiation with a frequency from 3 Hz to 300 GHz, the electromagnetic radiation including transmitter data related to parameters of the thermally transparent window member or electronic equipment being monitored through the thermally transparent window member, and
a cover for covering the forward facing surface of the thermally transparent window member, wherein the at least one transmitter is encased in the cover, and
wherein the thermally transparent window member is made from calcium fluoride, sapphire glass or PolyIR polymer that is transparent to infrared radiation.

2. A thermal window as claimed in claim 1, wherein the at least one transmitter is configured to transmit electromagnetic radiation with a frequency from 433 MHz to 435 MHz.

3. A thermal window as claimed in claim 1, wherein the cover is mounted to the window frame by a spring loaded hinge.

4. A thermal window as claimed in claim 1, wherein the electromagnetic radiation is a Wi-Fi™ signal.

5. A thermal window as claimed in claim 1, wherein the at least one transmitter is configured to transmit electromagnetic radiation with a power of less than or equal to 0 dBm.

6. A thermal window as claimed in claim 1, wherein the at least one transmitter is configured to transmit an electromagnetic signal with a range of less than or equal to 20 meters.

7. A thermal window as claimed in claim 1, wherein the transmitter data transmitted by the at least one transmitter includes a temperature of the thermally transparent window member.

8. A thermal window as claimed in claim 7, wherein the temperature is measurable by a thermocouple in contact with the thermally transparent window member.

9. A thermal window as claimed in claim 1, further comprising at least one transponder configured to transmit electromagnetic radiation with a frequency from 13 MHz to 14 MHz.

10. A thermal window as claimed in claim 9, wherein the at least one transponder is a radio-frequency identification (RFID) device.

11. A thermal window as claimed in claim 9, wherein the at least one transponder is encased in the cover.

12. A thermal window as claimed in claim 9, wherein the at least one transponder is configured to transmit transponder data, the transponder data including a location of the thermal window.

13. A thermal window as claimed in claim 1, wherein the at least one transmitter is configured to be powered by a battery.

14. A thermal window as claimed in claim 1, wherein the cover is moveable from a first position in which it protects the thermally transparent window member to a second position in which the thermally transparent window member is exposed.

15. A thermal window as claimed in claim 1, wherein the cover is at least partially transparent.

* * * * *